(12) United States Patent
Mezghani et al.

(10) Patent No.: US 11,946,367 B2
(45) Date of Patent: Apr. 2, 2024

(54) SYSTEMS AND METHODS FOR PROCESSING DRILL CUTTINGS

(71) Applicant: Saudi Arabian Oil Company, Dhahran (SA)

(72) Inventors: Mokhles M. Mezghani, Dhahran (SA); Abdul Hafiz O. Masri, Dhahran Hills (SA); Mustafa A. Al Ibrahim, Safwa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 448 days.

(21) Appl. No.: 17/183,863

(22) Filed: Feb. 24, 2021

(65) Prior Publication Data
US 2022/0268153 A1  Aug. 25, 2022

(51) Int. Cl.
*E21B 49/00* (2006.01)
*E21B 47/002* (2012.01)
*G01N 35/00* (2006.01)

(52) U.S. Cl.
CPC ........ *E21B 49/005* (2013.01); *E21B 47/0025* (2020.05); *G01N 35/0099* (2013.01); *G01N 2035/00495* (2013.01); *G01N 2035/00554* (2013.01)

(58) Field of Classification Search
CPC .... E21B 49/005; E21B 47/0025; E21B 21/01; G01N 35/0099; G01N 2035/00495; G01N 2035/00554; G01N 2035/00188; G01N 2035/00485; G01N 2035/00831; G01N 2035/00861; G01N 1/34; G01N 1/08; G01N 2035/0406

USPC .......................................................... 73/863
See application file for complete search history.

(56) References Cited

U.S. PATENT DOCUMENTS

| 2,692,755 | A | 10/1954 | Nowak |
| 7,730,795 | B2 | 6/2010 | Rieberer |
| 8,820,438 | B2 | 9/2014 | Ross et al. |
| 9,476,810 | B2 | 10/2016 | Gottlieb |

(Continued)

FOREIGN PATENT DOCUMENTS

| CA | 2356270 A1 | * | 6/2000 |
| CN | 212237770 U | * | 12/2020 |

(Continued)

OTHER PUBLICATIONS

International Search Report for PCT/IB2021/053745, 4 pages (dated Nov. 17, 2021).

(Continued)

*Primary Examiner* — Marrit Eyassu
(74) *Attorney, Agent, or Firm* — Osha Bergman Watanabe & Burton LLP

(57) ABSTRACT

An example system may be used to automate one or more processes relating to drill cutting handling, cleaning, and packing to produce consistently high-quality cleaned samples. In some implementations, an example system may employ cleaning processes including centrifugal and ultrasonic processes to clean a sample automatically without the aid of a human operator thereby increasing efficiency and quality of the produced samples for better subsequent sample analysis. A system may include an unloading module, a cleaning module, and packing module, all of which may be operated in combination with a robotic arm.

20 Claims, 4 Drawing Sheets

(56) References Cited

U.S. PATENT DOCUMENTS

| | | |
|---|---|---|
| 9,636,678 B2 | 5/2017 | Briggs |
| 9,651,461 B2 | 5/2017 | Snape et al. |
| 9,920,623 B1 | 3/2018 | Leeper et al. |
| 2011/0277798 A1 | 11/2011 | Hillier |
| 2012/0193146 A1* | 8/2012 | James ................... E21B 21/066 175/66 |
| 2015/0090292 A1 | 4/2015 | DePatie |
| 2016/0349278 A1* | 12/2016 | Johns ..................... G01N 35/04 |
| 2020/0080419 A1 | 3/2020 | Smith |
| 2020/0284145 A1* | 9/2020 | ElGamal ............... E21B 49/084 |

FOREIGN PATENT DOCUMENTS

| | | |
|---|---|---|
| EP | 3 156 587 A1 | 4/2017 |
| EP | 3156587 A1 * | 4/2017 |
| WO | WO-2009/074815 A2 | 6/2009 |

OTHER PUBLICATIONS

Written Opinion for PCT/IB2021/053745, 7 pages (dated Nov. 17, 2021).

* cited by examiner

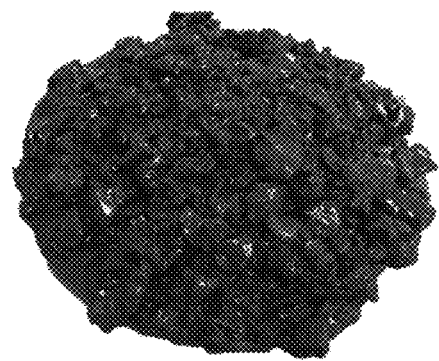
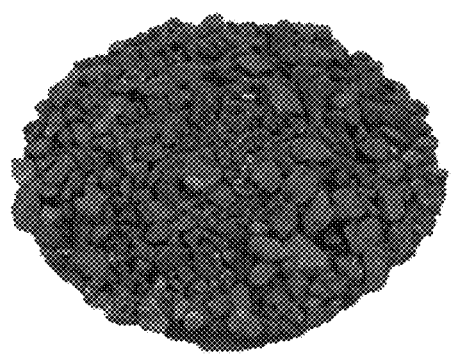
FIG. 1A    FIG. 1B
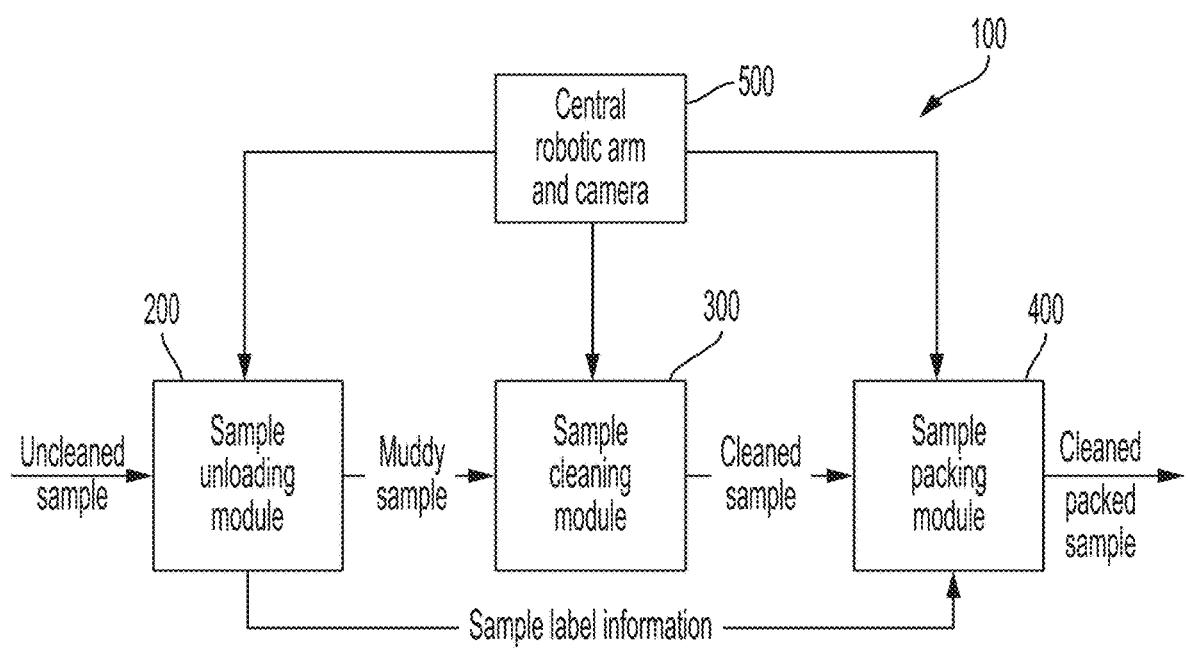
FIG. 2

SYSTEMS AND METHODS FOR PROCESSING DRILL CUTTINGS

TECHNICAL FIELD

This specification describes technologies for processing a sample form a rock formation.

BACKGROUND

Drill cuttings include particles of a rock formation derived from a borehole, for example, a wellbore in a rock formation, for example, a wellbore in a hydrocarbon bearing rock formation. These particles include rock chips generated by a drill or may include particles (chips) from drilling equipment. The drill cuttings are carried to the surface by fluid, for example, the drilling fluid. Drill cuttings are often collected and analyzed, for example, to perform a lithology analysis or a fluid analysis. From the analysis, several parameters of interest may be derived, for example, origin or geological history of the rock or wellbore fluids.

SUMMARY

An example system is for processing a sample that includes drill cuttings from a wellbore in a rock formation. The system includes an unloading module for transferring the sample from a collection container to a sample tube. The unloading module includes a funnel and an unloading module camera for reading a label on the collection container. The system includes a cleaning module for cleaning a sample. The cleaning module includes a tank that includes a centrifuge for centrifuging at least one sample tube. The system includes a packing module for packaging a sample. The packing module includes a tray for receiving the sample form the at least one sample tube. The packing module includes a packing module camera for imaging the sample. The packing module includes a packing and labeling device for packaging the sample. The system includes a robotic arm for transferring the sample tube between the unloading module, the cleaning module, and the packing module. The robotic arm includes a robotic arm camera.

The unloading module may include a water jet nozzle for discharging a water jet to drive the sample from the collection container to the funnel.

The sample tube may include an opening and a removable perforated top cap at proximal end and an opening and a removable perforated bottom cap at a distal end, and where the unloading module is arranged such that the sample tube receives the sample from the funnel through the opening at the proximal end.

The tank of the cleaning module may include a fluid fill valve to control inflow of fluid into the tank from a reservoir in fluid connection with the tank and a flushing valve to control outflow of the fluid from the tank. The tank of the cleaning module may include an ultrasonic transducer configured to agitate the fluid in the tank to break up the sample.

The tray of the packing module may be a retractable tray that has a closed configuration and an open configuration. When the tray is in a closed configuration, the sample is held steady on the tray in a field of vision of the packing module camera. When the tray is in an open position, the sample is moveable to a storage container positioned under or in fluid communication with the tray.

The packing module may include an air jet nozzle to discharge an air jet to drive at least a part of the sample from the tray or sample tube into a clean storage container. The packing module may include a labeling device to generate a label and affix the label to the storage container.

The robotic arm may include at least one of a water jet nozzle and an air jet nozzle. The robotic arm camera may be configured to image the sample on the tray.

An example method for processing a sample comprising drill cuttings from a wellbore in a rock formation includes receiving the sample by an unloading module of a sample processing system. The method includes transferring the sample from a collection container to a sample tube. The unloading module includes a funnel. The method includes reading a label on the collection container by an unloading module camera. The method includes transferring, by a robotic arm, the sample tube from the unloading module to a cleaning module comprising a tank, which includes a centrifuge. The method includes centrifuging at least one sample tube. The method includes transferring, by the robotic arm, the sample tube to a packing module including a tray for receiving the sample form the sample tube, a packing module camera, and a packing and labeling device. The method includes imaging the sample by the packing module camera. The method includes packing by the packing and labeling device the sample in a storage container.

The method may include discharging a water jet from a water jet nozzle of the unloading module to drive the sample from the collection container to the funnel.

The method may include receiving, by the sample tube, the sample from the funnel through an opening at a proximal end of the sample tube.

The method may include filling the tank at least in part with a fluid received from a reservoir in fluid connection with the tank, prior to centrifuging. The method may include agitating the fluid in the tank using an ultrasonic transducer to break up the sample.

The method may include imaging the sample on the tray of the packing module by a packing module camera. The method may include moving the sample to a storage container positioned under or in fluid communication with the tray. The method may include discharging, from an air jet nozzle of the packing module, an air jet to drive at least a part of the sample from the tray or sample tube into a storage container. The method may include generating, by a labeling device of the packing module, a label and affixing the label to the storage container.

The method may include discharging at least one of a water jet and an air jet from a water jet nozzle and an air jet nozzle mounted on the robotic arm. The method may include imaging the sample be a camera mounted on the robotic arm.

Any two or more of the features described in this specification, including in this summary section, may be combined to form implementations not specifically described in this specification. The details of one or more implementations are set forth in the accompanying drawings and the description. Other features and advantages will be apparent from the description and drawings, and from the claims.

BRIEF DESCRIPTION OF THE DRAWINGS

These and other features, aspects, and advantages of the present technologies will become better understood with regard to the following descriptions, claims, and accompanying drawings. It is to be noted, however, that the drawings illustrate only several implementations and are therefore not to be considered limiting.

FIG. 1A is a photograph of a sample with drill cuttings amalgamated with drilling mud prior to cleaning. FIG. 1B is a photograph of a cleaned sample of drill cuttings where drilling mud has been removed.

FIG. 2 is a diagram of an example arrangement of the modules and the robotic arm of an example system for processing drill cuttings.

Like reference numerals in the figures indicate like elements.

DETAILED DESCRIPTION

Figure 3:
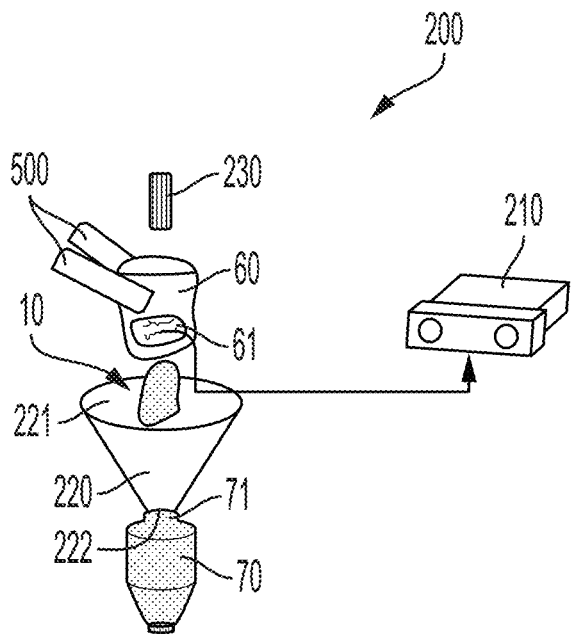
FIG. 3 is a diagram of an example unloading module of an example system for processing drill cuttings.

This specification describes example systems and methods for processing a sample from a wellbore in a rock formation, for example, in a hydrocarbon bearing rock formation. The sample may include an amount of drill cuttings, for example, rock chips generated by a drill or particles (chips) from drilling equipment.

Drill cuttings are one of the most common physical sample types obtained from boreholes while drilling. Thus, they can be an important source of information. Drill cuttings are commonly collected from a rig shale shaker. A rig shale shaker is a device for removing drilled solids from drill mud. The shaker commonly includes a vibrating sieve or screen over which drilling fluid is flowed to allow fluid to pass through the screen while solid are collected on the screen surface. Samples that may include drill cuttings are generally collected from the borehole at specified depth intervals, for example, every 10 feet, and transferred uphole by the drilling mud. Collection methods or protocols usually compensate for mud travel time from the bottom of the borehole to the rig shale shaker at the surface. The collection of sample from the shale shaker, handling, measurement, and packing processes are largely manual and often performed by a wellsite geologist. The manual handling of the sample can result in variable quality in the final sample to be analyzed.

An example of a method for handling drill cuttings is as follows. A human operator, for example, a geoscientist, manually collects a sample from the rig shale shaker located in the drilling rig floor, for example, using a spatula. The sample may be deposited in a plastic bag or a cloth bag. The size of the sample may vary depending on the amount of drill mud visible to the operator, the amount of drill cuttings available in the sample, and may vary between human operators. The sample may be transported to a portable lab where the sample may first be divided into two "patches": one for real-time analysis on site and the other to be sent to be stored and transferred to a central facility for further analysis. The first patch may be cleaned with water if oil-based mud is not used or with a water/amphiphile mixture if oil-based mud is used. Any extra water or other fluid may be drained. A portable dryer may be used to dry the sample, or a sample/patch may be left in the open air to dry. The sample may then analyzed by the operator.

FIGS. 1A and 1B show a drill cutting sample patch before and after cleaning, respectively. FIG. 1A shows a sample with drill cuttings amalgamated with drilling mud prior to cleaning. FIG. 1B shows a cleaned sample of drill cuttings where drilling mud has been removed. After cleaning, the drill cuttings may be placed on an examination tray and examined by the operator under an optical microscope. Relative amounts of rock chips generated by a drill or particles (chips) from drilling equipment and proportions of mineralogical constituents of the sample may be assessed visually. For example, ultraviolet light may be used to determine the presence of hydrocarbon. After visual inspection, the textural characteristics of the drill cuttings may be recorded and the sample may be discarded. A second patch may be sent to a storage facility where it is cleaned, and the patch (or a representative sample of the patch) may be stored for later analysis if needed. Again, the cleaning, handling, and packing procedure is generally performed manually.

This specification describes technologies including systems and methods that may be used to automate the process of handling, cleaning, and packing drill cutting samples. The technologies may be used both at a wellsite and in the lab offsite. The technologies are automated and can clean, and may be configured to analyze, and package multiple samples without the need of human assistance.

An example system described in this specification may be used to automate one or more processes relating to drill cutting handling, cleaning, and packing to produce consistently high-quality cleaned samples. In some implementations, an example system may employ cleaning processes including centrifugal and ultrasonic processes to clean a sample automatically without the aid of a human operator thereby increasing efficiency and quality of the produced samples for better subsequent sample analysis.

An example system for processing a sample from a wellbore in a rock formation, for example, in a hydrocarbon bearing rock formation that may include drill cuttings, may include an unloading module, a cleaning module, and a packaging module. An example system as described in this specification may include a robotic arm for transferring the sample tube between the unloading module, the cleaning module, and the packing module. A diagram describing an example arrangement of the modules and the robotic arm of an example system 100 is shown in FIG. 2.

An example unloading module 200 may include one or more devices arranged or configured to receive and transfer a sample from a collection container (for example, a collection bag) to a sample container, for example, a sample tube. An example cleaning module 300 may include one or more devices arranged or configured to receive a sample container, for example, a sample tube and to clean a sample in the container, for example, by removing drill mud or otherwise separating drill cuttings from the sample. An example packing module 400 may include one or more devices (for example, a tray) arranged or configured to receive and extract the sample form the sample container and a packing module camera for imaging the sample or for reading a label, for example, a label on a sample tube. The packing module may include a packing and labeling device for packaging the sample into a storage container. A storage container may be transferred to a larger storage unit, for example, a storage box. An example robotic arm 500 may include one or more air jet nozzles, one or more water jet nozzles, and a robotic arm camera.

An example system 100 as described in this specification includes an unloading module. A diagram of an example unloading module 300 is shown in FIG. 3. In some implementations, an unloading module 300 may operate as a standalone device with the aid of a human operator or as part of the automated workflow, for example, in a system including the robotic arm. The unloading module 300 is configured to receive a sample retrieved from a wellbore. In some implementations, the unloading module 300 may receive a cutting sample from a collection container, for example, a collection bag 60. A collection container, for example, a collection bag 60, may include a label 61, for example, a printed label or an RFID tag. In some implementations, the label 61 may display sample information, for example, field name, well name, sample depth interval, sample number, collection date, sample number, collection date, origin or sample, or other identifying information. In some implementations, a collection container (for example, collection bag 60) may be delivered to the system 100 in a secondary container holding one or more collection containers (for example, collection bags 60). A collection container may be retrieved from the secondary container using a robotic arm 500 that is part of the example system 100. In some implementations, the robotic arm 500 may rotate or translate the sample collection container (for example, collection bag 60) such that the label faces a camera, for example, an unloading module camera 210. An image of the label 61 may be taken by the unloading module camera 210 and transferred to a central processing unit (not shown). In some implementations, a camera mounted on the robotic arm 500 may be used (not shown). The image may be analyzed using the central processing unit using image processing techniques, for example, optical character recognition, for example, in combination with machine learning, to obtain the sample number and other information.

In some implementations, the collection container (for example, collection bag 60) is transferred by the robotic arm 500 to a position above the larger (proximal) opening 221 of a funnel 220 of the unloading module 200. The collection container (for example, collection bag 60) may be opened, for example, using an implement of the robotic arm 500 or an auxiliary device, for example, a second robotic arm (not shown). In some implementations, a collection bag 60 is torn open using an implement of the robotic arm 500 or an auxiliary device, for example, a second robotic arm (not shown). The collection container (for example, collection bag 60) may be positioned and opened such that the sample 10 falls into the proximal end opening of the funnel. In some implementations, one or more fluid jets, for example, one or more gas jets or one or more water jets may be used to wash the sample 10 down the funnel 220 toward a distal end of the funnel 220. The one or more fluid jets may be discharged from an unloading module nozzle 230. Unloading module nozzle 230 may include a gas jet nozzle or an air jet nozzle. In some implementations, the robotic arm 500 may include at least one of an air jet nozzle and a water jet nozzle for discharging an air jet or a water jet to drive the sample down the funnel. In some implementations, the robotic arm 500 may include at least one of an air jet nozzle and a water jet nozzle for discharging an air jet or a water jet to drive the sample 10 from the torn collection bag 60 down to the funnel 220. The distal end 222 of the funnel 220 may be connected to a sample container, for example, a sample tube 70, for example, at a proximal end of the sample container, for example, at a proximal end 71 of the sample tube 70. The distal opening of the funnel 200 may be in fluid communication with a proximal opening of a sample tube 70. In some implementations, a sample 10 is washed with water or air to transfer the sample 10 to the sample tube 70 to be transferred to the cleaning module 300 using the robotic arm 500.

Figure 4:
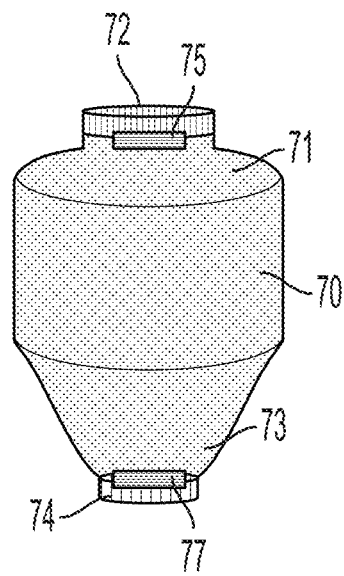
FIG. 4 is a graphical representation of a sample container of an example system for processing drill cuttings.

In some implementations, a sample container is a sample tube 70 as illustrated in FIG. 4. In an example implementation, a sample tube 70 may have two caps: a first cap 72 at a proximal opening at proximal end 71 (top) and a second cap 74 at a distal opening at distal end 73 (bottom) of the sample tube 70. A cap may be removable, for example, held in place with a latch, for example, a first latch 75 holding first cap 72 and a second latch 77 holding second cap 74. An example sample tube 70 may be adapted to handle a relatively large sample, for example, a sample of about 250-500 milliliters (ml). The sample container, for example, the sample tube 70, and the caps 72 and 74 may be made of a material having perforations, for example, circular perforations. In some implementations, the perforations may have a constant diameter. The diameter of the perforations may be equal or less than the smallest expected drill cutting size that needs to be collected, for example, 0.25 mm for medium grain cuttings and 0.5 mm for coarse grain cuttings.

Figure 5A:
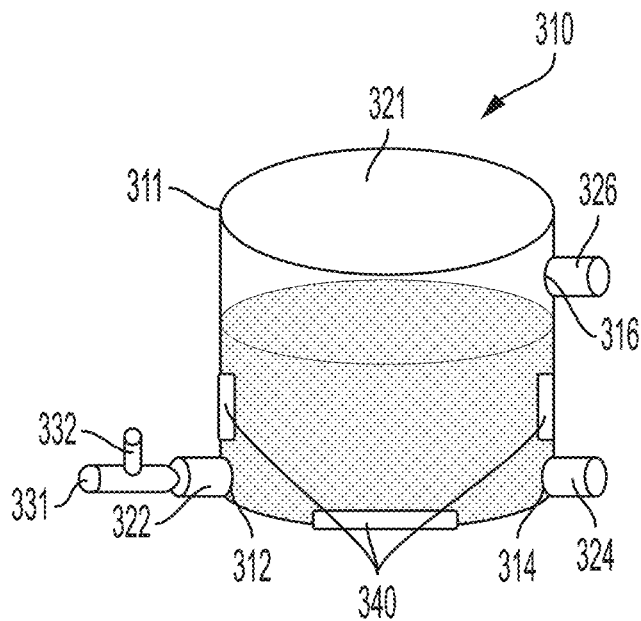
FIG. 5A is a diagram of a centrifuge tank of a cleaning module of an example system for processing drill cuttings.
Figure 5B:
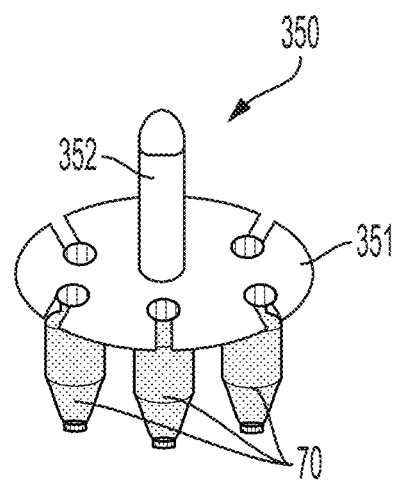
FIG. 5B is a diagram of a centrifuge of a cleaning module of an example system for processing drill cuttings.

An example system 100 as described in this specification includes a cleaning module 300. A diagram of an example cleaning module 300 is shown in FIGS. 5A and 5B. In some implementations, a cleaning module 300 may operate as a standalone device with the aid of a human operator or as part of the automated workflow, for example, in a system including the robotic arm 500.

A cleaning module may include a tank 310 (for example, as shown in FIG. 5A) and a centrifuge 350 (for example, as shown in FIG. 5B). The centrifuge 350 may be enclosed by and housed by the tank 310. An example centrifuge 350 may be used to clean one or more samples 10 and remove drilling muds. In some implementations, the centrifuge may be adapted or capable of operating in wet or dry conditions. An example cleaning module 300 may be configured to receive and process a sample 10 delivered in a sample container as described in this specification, for example, a sample tube 70. One or more sample tubes 70 may be inserted into a sample tube holder 351, for example, using robotic arm 500. A sample tube holder may be mounted on a shaft 352 that is connected to a centrifuge motor (not shown). The centrifuge motor may be controlled by a central processing unit. One or more components of centrifuge 350, for example, sample tube holder 351, may be enclosed or housed by tank 310. Tank 310 may be open or may be closed at a top end 311 by a lid 321. Tank 310 may include or may be connected to one or more conduits, tubes, valves, and the like to control fluid flow into and out of the tank 310. An example tank 310 may include a fluid fill valve 322 disposed at an inlet 312 of the tank 310. Fluid fill valve 322 may be in fluid connection to an upstream water line 331 or an upstream amphiphile fluid line 332. An example tank 310 may include a flushing valve 324 disposed at an outlet 314 of the tank 310. An example tank 310 may include a hot air valve 326 disposed at an air inlet 316 of the tank 310. Hot air valve 326 may be in fluid connection to an upstream gas line (not shown). In some implementation, example tank 310 may include or may be connected to (for example, attached to) one or more ultrasonic transducers 340.

Figure 6:
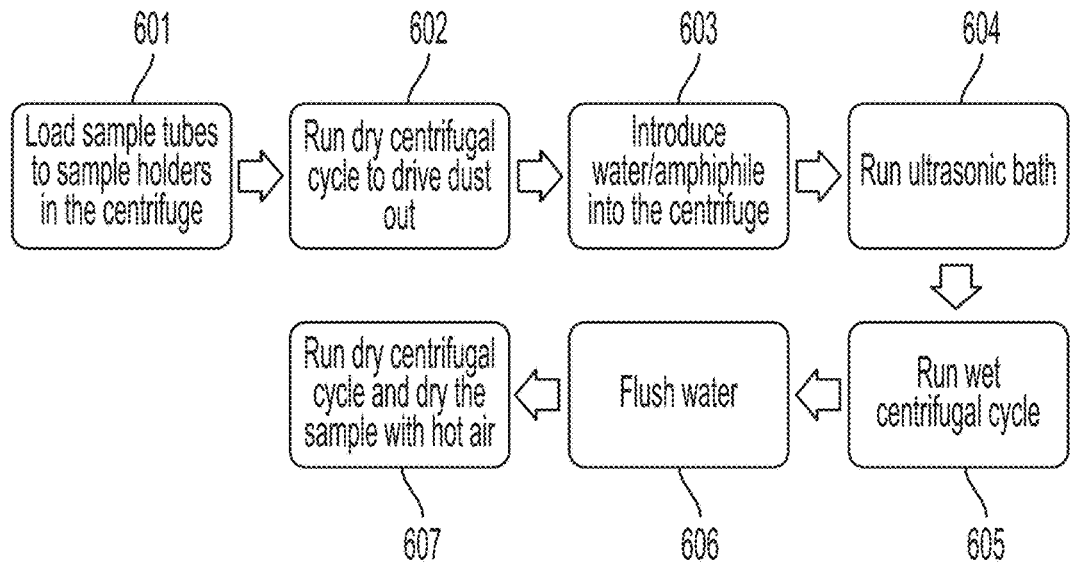
FIG. 6 is a flow chart illustrating an example general (wet) cleaning procedure performed by an example system for processing drill cuttings.

FIG. 6 shows a flow chart illustrating an example general (wet) cleaning procedure (601). At the start of the procedure, the tank 310 is empty and the centrifuge 350 may be unloaded. One or more sample containers, for example, sample tubes 70 as shown in FIG. 4, are inserted into corresponding slots in holder 351 of the centrifuge, for example, using the robotic arm 500 or by a human operator. An initial short (dry) centrifugal cycle, for example, a cycle of 30 seconds, is used to drive out dust (602). In some implementations, an air jet delivered by a nozzle (not shown) in the tank 310 may also be used to drive out dust. The fluid fill valve 322 is opened and the tank 310 is filled with a fluid (for example, water or a mixture of water and an amphiphile) and the samples are soaked (603). In some implementations, one or more ultrasonic transducers 340 may be used to break up the sample and separate drilling mud from the drill cuttings (604). In some implementations, the ultra-sonication process may take from 2-4 minutes. After ultra-sonication, the centrifuge 350 is turned on (605). The broken-up mud particle flow out of the sample tubes 70 through the perforations in the sample tube 70 driven by the centrifugal force. In some implementations, the centrifugation procedure may take about 2 minutes. The centrifuge 350 is stopped and the tank 310 is flushed by opening a flushing valve 324 (606). In some implementations, fresh fluid may be introduced through the fluid fill valve 322 and a second ultra-sonication procedure may be performed. In some implementations, a second centrifugation cycle may be performed. At the end of the second centrifugal cycle, the fluid may be removed through the flushing valve 324 and a dry centrifugal cycle may be performed (607). In some implementations, hot air (for example, at 40 degrees centigrade or less) is conducted into the tank through hot air valve 326 to aid drying the sample. The (dried) samples may then be removed from the centrifuge 350 and transferred to the packing module 400, for example, using the robotic arm 500 or by a human operator.

Figure 7:
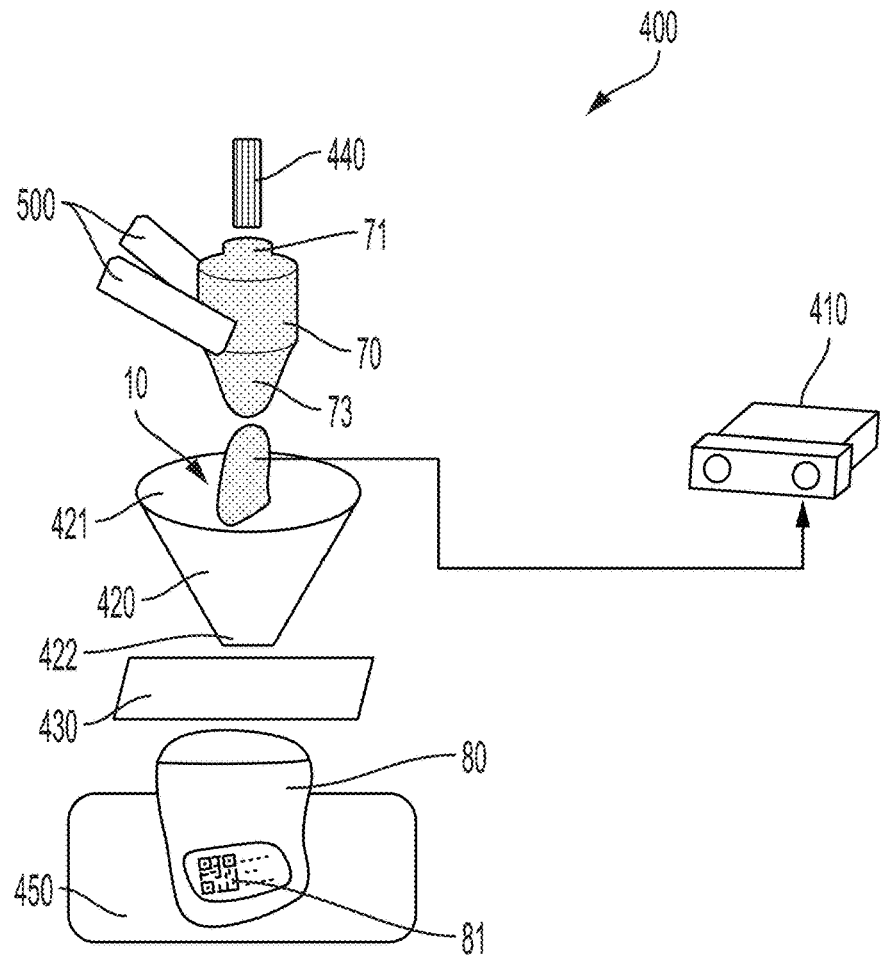
FIG. 7 is a diagram of an example packing module of an example system for processing drill cuttings.

An example system as described in this specification includes a packing module. A diagram of an example packing module 400 is shown in FIG. 7. In some implementations, a packing module 400 may operate as a standalone device with the aid of a human operator or as part of the automated workflow, for example, in a system including the robotic arm 500.

A packing module may be adapted to package one or more cleaned samples in a (clean) storage container, for example, a storage bag 80. Storage bag 80 may be a plastic bag or a paper bag. In some implementations, a dry cutting sample is transferred to packing module 400 from the cleaning module 300 in a sample tube 70, for example, using the robotic arm 500. In some implementations, the sample container (for example, sample tube 70) is transferred by the robotic arm 500 to a position above the larger (proximal) opening 421 of a funnel 420 of the packing module 400. A sample container, for example, a sample tube 70, is opened from two ends, for example, a proximal opening at proximal end 71 and a distal opening at distal end 73. The sample container may be opened, for example, using an implement of the robotic arm 500 or an auxiliary device, for example, a second robotic arm (not shown). The sample container (for example, sample tube 70) may be positioned and opened such that the sample 10 falls into the proximal end opening 421 of the funnel 420. The distal end opening 422 of the funnel is positioned above a retractable tray 430 that is adapted to hold the sample 10. In some implementations, the packing module includes a camera, for example, a packing module camera 410. A high-resolution image of the sample may be taken by the packing module camera 410 and transferred to a central processing unit (not shown). In some implementations, a camera mounted on the robotic arm 500 may be used. In an example implementation, packing module camera 410 may be or may include a top mounted specialized high-resolution camera, for example, a hyperspectral camera.

In some implementations, after taking one or more images, the sample 10 is transferred to a storage container, for example, storage bag 80. In some implementations, the retractable tray 430 may have at least two configurations, for example, a closed configuration and an open configuration. When the tray 430 is in a closed configuration, the sample 10 is held steady on the tray in a field of vision of the packing module camera 410. When the tray is in an open position, the sample 10 is moveable to a storage container (for example, a storage bag 80) positioned under or in fluid communication with the tray 430. In some implementations, the sample is moved by force of gravity, for example, after opening the retractable tray 430. In some implementations, an air jet may be used to clean any leftover particles from the sample container, for example, sample tube 70. The one or more air jets may be discharged from a packing module nozzle 440. Packing module nozzle 440 may include a gas jet nozzle or an air jet nozzle. In some implementations, a maximum weight may be set for the storage container to allow only a subset of the sample 10 to be preserved. In some implementations, the storage container (for example, storage bag 80) may be transferred, by the robotic arm, to storage container collection box not shown.

Figure 8:
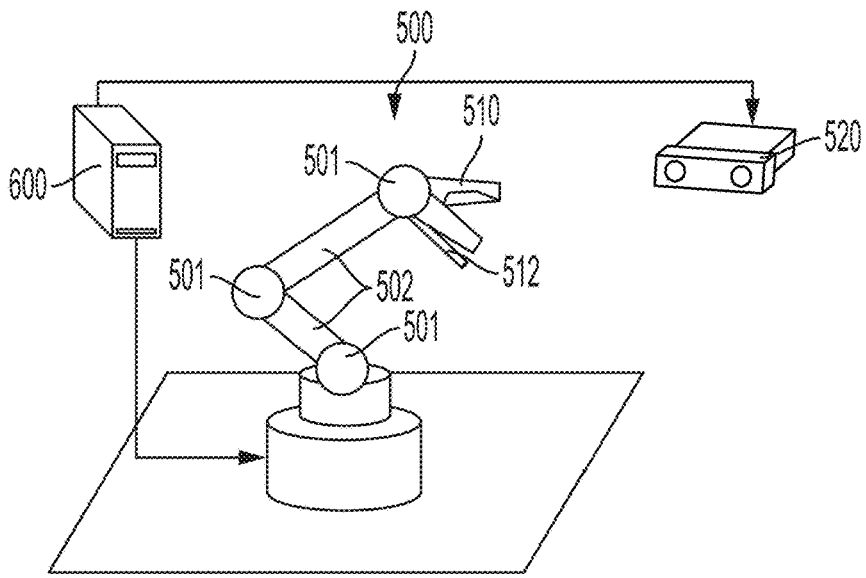
FIG. 8 is a diagram of an example robotic arm of an example system for processing drill cuttings.

In some implementations, the packing module 400 may be configured or adapted depending on business or operational requirements or restrictions. For example, a miniaturized packing machine similar to those used in potato chip packing may be used for packaging a sample into a bag-type storage container. In such an embodiment, the bag may be constructed as a heat-sealable bag. Such bags may be dispensed from a roll of empty and deflated bags. In some implementations, a packing module may include a labeling device 450. A label 81 displaying or otherwise containing sample information may be affixed to each storage container, for example, storage bag 80. The information may be or include information digitized from the collection container, for example, collection bag 60. The information may be or include information inputted by a human operator. In some implementations, a label 81 may be or may include an adhesive label may be created and glued onto the storage container, for example, storage bag 80. In some implementations, a storage bag 80 may be filled with cleaned drill cuttings (sample 10) and sealed by heat. An example system as described in this specification includes a robotic arm. A diagram of an example robotic arm 500 subsystem is shown in FIG. 8. The robotic arm 500 may be used to carry out one or more processes relating to the overall operation of the system 100 described in this specification. In some implementations, the robotic arm includes one or more links 501 connected through one or more joints 502. In some implementations, the robotic arm 500 is equipped with a gripping mechanism 510, for example, a set of one or more claws or jaws at a distal end of a link at a distal end or the arm 500. The joints/links and the claws or jaws may be actuated by hydraulics, pneumatics, or electric motors, and may be controlled by an electronic control unit 600. The gripping mechanism may be configured to grip and tear irregular objects, for example, to grip and tear a collection bag 60. The gripping mechanism 510 may be configured to hold a sample container, for example, a sample tube 70, and may be configured to open and close the latched caps 72 and 74.

In some implementations, the robotic arm 500 may include one or more fluid nozzles 512 in fluid connection to one or more hoses. In some implementations, the one or more fluid nozzles 512 may be or include a water jet nozzle to discharge a water jet or gas jet nozzle (for example, an air jet nozzle) to discharge a gas jet (for example, an air jet), for example, to clean or move a sample 10. In some implementations, a robotic arm may include a robotic arm camera 520, which may be mounted on one of the links of the robotic arm. In some implementations, a robotic arm 500 may be connected to a robotic arm camera 520, for example, via a control unit 600, for example, for optical navigation (movement) of the robotic arm 500 via control unit 600. In some implementations, the robotic arm camera 520 may be used to image a sample 10 or a collection container, for example, collection bag 60, or storage container, for example, storage bag 80. In some implementations, a robotic arm 500 may be connected to a robotic arm camera system with a depth sensor. The robotic arm 500 may be controlled by a control unit 600 or another central processing unit. A control unit 600 or central processing unit may be used for analyzing images or videos obtained from on or connected to the robotic arm (for example, robotic arm camera(s) 520) and may be used for automatically guiding the arm 500 between modules. In some implementations, if the cleaning module 300 is operated as a standalone device, the operations described for the robotic arm 500 may be carried out by a human operator, for example, a geologist.

Figure 9:
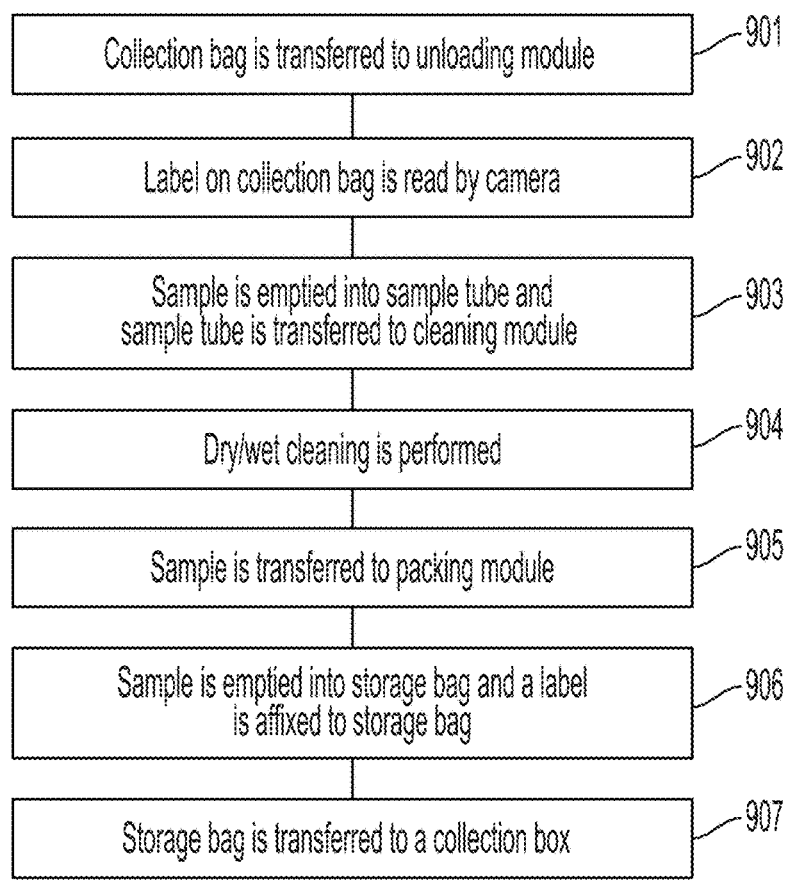
FIG. 9 is a flow chart illustrating an example operation performed by an example system for processing drill cuttings.

A flow chart for a basic example operation of a system 100 is shown in FIG. 9. A Collection bag is transferred from a wellbore to an unloading module (901). The label on the collection bag is read by a camera (902). The sample is emptied into a sample tube and the sample tube is transferred to a cleaning module by a robotic arm (903). Dry/wet cleaning procedures are performed on the sample (904). The sample is transferred to a packing module by the robotic arm (905). The sample is emptied into storage bag and a label is affixed to storage bag (906). The storage bag is transferred to a collection box (907).

At least part of the systems and methods described in this specification and their various modifications may be controlled, at least in part, by a computer program product, such as a computer program tangibly embodied in one or more information carriers, such as in one or more tangible machine-readable storage media, for execution by, or to control the operation of, data processing apparatus, for example a programmable processor, a computer, or multiple computers.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a network.

Actions associated with implementing the systems may be performed by one or more programmable processors executing one or more computer programs to perform the functions of the calibration process. All or part of the systems may be implemented as special purpose logic circuitry, for example an field programmable gate array (FPGA) or an ASIC application-specific integrated circuit (ASIC), or both.

Processors suitable for the execution of a computer program include, by way of example, both general and special purpose microprocessors, and any one or more processors of any kind of digital computer. Generally, a processor will receive instructions and data from a read-only storage area or a random access storage area or both. Components of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, for example magnetic, magneto-optical disks, or optical disks. Non-transitory machine-readable storage media suitable for embodying computer program instructions and data include all forms of non-volatile storage area, including by way of example, semiconductor storage area devices, for example erasable programmable read-only memory (EPROM), electrically erasable programmable read-only memory (EEPROM), and flash storage area devices; magnetic disks, for example internal hard disks or removable disks; magneto-optical disks; and CD-ROM and DVD-ROM disks.

Each computing device, such as a surface-locating computing system, may include a hard drive for storing data and computer programs, and a processing device (for example a microprocessor) and memory (for example RAM) for executing computer programs. Each computing device may include an image capture device, such as a still camera or video camera. The image capture device may be built-in or simply accessible to the computing device.

Each computing device may include a graphics system, including a display screen. A display screen, such as a liquid crystal display (LCD) or a CRT (Cathode Ray Tube) displays, to a user, images that are generated by the graphics system of the computing device. As is well known, display on a computer display (for example a monitor) physically transforms the computer display. For example, if the computer display is LCD-based, the orientation of liquid crystals may be changed by the application of biasing voltages in a physical transformation that is visually apparent to the user. As another example, if the computer display is a CRT, the state of a fluorescent screen may be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard or Arabic keyboard and scroll wheel may be provided for entering information onto the display screen. Each computing device, and computer programs executed on such a computing device, may also be configured to accept voice commands, and to perform functions in response to such commands. For example, the process described in this specification may be initiated at a client, to the extent possible, via voice commands.

Components of different implementations described in this specification may be combined to form other implementations not specifically set forth in this specification. Components may be left out of the systems, computer programs, databases, etc. described in this specification without adversely affecting their operation. In addition, the logic flows shown in, or implied by, the figures do not require the particular order shown, or sequential order, to achieve desirable results. Various separate components may be combined into one or more individual components to perform the functions described here.

What is claimed:

1. A system for processing a sample comprising drill cuttings from a wellbore in a rock formation, the system comprising:

an unloading module for transferring the sample from a collection container to a sample tube using a funnel, the unloading module comprising an unloading module camera for reading a label on the collection container;

a cleaning module for cleaning a sample, the cleaning module comprising a tank comprising a centrifuge for centrifuging the sample tube;

a packing module for packaging a sample into a storage container, the packing module comprising a tray for receiving the sample from the sample tube, a packing module camera for imaging the sample, and a labeling device for labeling the storage container containing the sample; and a robotic arm for transferring the sample tube between the unloading module, the cleaning module, and the packing module, the robotic arm comprising a robotic arm camera.

2. The system of claim 1, where the unloading module comprises a water jet nozzle for discharging a water jet to drive the sample from the collection container to the funnel.

3. The system of claim 1, where the sample tube comprises an opening and a removable perforated top cap at a proximal end and an opening and a removable perforated bottom cap at a distal end, and where the unloading module is arranged such that the sample tube receives the sample from the funnel through the opening at the proximal end.

4. The system of claim 1, where the tank of the cleaning module comprises a fluid fill valve to control inflow of fluid into the tank from a reservoir in fluid connection with the tank and a flushing valve to control outflow of the fluid from the tank.

5. The system of claim 1, where the tank of the cleaning module comprises an ultrasonic transducer configured to agitate the fluid in the tank to break up the sample.

6. The system of claim 1, where the tray of the packing module is a retractable tray having a closed configuration and an open configuration, where, when the tray is in a closed configuration, the sample is held steady on the tray in a field of vision of the packing module camera, and when the tray is in an open position, the sample is moveable to the storage container positioned under or in fluid communication with the tray.

7. The system of claim 1, where the packing module comprises an air jet nozzle to discharge an air jet to drive at least a part of the sample from the tray or sample tube into the storage container.

8. The system of claim 7, where the labeling device is configured to generate a label and affix the label to the storage container.

9. The system of claim 1, where the robotic arm comprises at least one of a water jet nozzle and an air jet nozzle.

10. The system of claim 1, where the robotic arm camera is configured to image the sample on the tray.

11. A method for processing a sample comprising drill cuttings from a wellbore in a rock formation, the method comprising:

receiving the sample from a collection container in a funnel located in an unloading module of a sample processing system;

transferring the sample to a sample tube using the funnel;

reading, by an unloading module camera, a label on the collection container;

transferring, by a robotic arm, the sample tube from the unloading module to a cleaning module comprising a tank comprising a centrifuge;

centrifuging the sample tube;

transferring, by the robotic arm, the sample tube to a packing module, the packing module comprising a tray for receiving the sample from the sample tube, a packing module camera, and a labeling device, imaging, by the packing module camera, the sample; and packing, by the packing device, the sample in a storage container.

12. The method of claim 11, comprising discharging, from a water jet nozzle of the unloading module, a water jet to drive the sample from the collection container to the funnel.

13. The method of claim 11, comprising receiving, by the sample tube, the sample from the funnel through an opening at a proximal end of the sample tube.

14. The method of claim 11, comprising filling the tank at least in part with a fluid received from a reservoir in fluid connection with the tank, prior to centrifuging.

15. The method of claim 14, comprising agitating the fluid in the tank using an ultrasonic transducer to break up the sample.

16. The method of claim 11, comprising imaging, by the packing module camera, the sample on the tray of the packing module, and moving the sample to the storage container positioned under or in fluid communication with the tray.

17. The method of claim 11, comprising discharging, from an air jet nozzle of the packing module, an air jet to drive at least a part of the sample from the tray or sample tube into the storage container.

18. The method of claim 17, comprising generating, by the labeling device of the packing module, a label and affixing the label to the storage container.

19. The method of claim 11, comprising discharging at least one of a water jet and an air jet from a water jet nozzle and an air jet nozzle mounted on the robotic arm.

20. The method of claim 11, comprising imaging the sample by a camera mounted on the robotic arm.

* * * * *